United States Patent [19]
Black et al.

[11] Patent Number: 4,866,703
[45] Date of Patent: Sep. 12, 1989

[54] INTEGRATED SERVICES DIGITAL NETWORK MODULE

[75] Inventors: James B. Black, Phoenix; Donovan A. Bruce, Glendale; Mauro Cordani, Phoenix; Mike Gilbert, Glendale; Tom Perry; Arthur L. Walsh, both of Phoenix; Gary Wiren; Steve A. Wright, both of Phoenix; John S. Young, Scottsdale, all of Ariz.

[73] Assignee: AG Communication Systems Corporation, Phoeniz, Ariz.

[21] Appl. No.: 138,102

[22] Filed: Dec. 28, 1987

[51] Int. Cl.⁴ ............................................. H04J 3/02
[52] U.S. Cl. ................................... 370/60; 370/110.1
[58] Field of Search ......................... 370/110.1, 94, 60

[56] References Cited

U.S. PATENT DOCUMENTS

| | | | |
|---|---|---|---|
| 4,592,045 | 5/1986 | Fundneider | 370/110.1 |
| 4,592,048 | 5/1986 | Beckner et al. | 370/60 |
| 4,627,047 | 12/1986 | Pitroda et al. | 370/110.1 |
| 4,644,527 | 2/1987 | Anderson et al. | 370/110.1 |
| 4,700,340 | 10/1987 | Beranek et al. | 370/60 |
| 4,704,716 | 11/1987 | Bowers et al. | 370/63 |

Primary Examiner—Douglas W. Olms
Assistant Examiner—Min Jung
Attorney, Agent, or Firm—Anthony Miologos

[57] ABSTRACT

An Integrated Services Digital Network module includes a time division multiplexed switching network. Subscribers are connected to the time division multiplex network via a number of facility interface cards. These facility interface cards provide for two wire subscriber connection, four wire subscriber connection, T1 line connection and for three port conferencing arrangements. Originating and terminating multiplexers connect the facility interface cards to the time switching network. Another subsystem provides protocol interfaces for HDLC channels. Another subsystem provides interface to central office switching systems. Lastly, a general purpose computer and file computer system provide for the storage of database and form maintenance functions. Each subsystem is controlled via processor which is linked with each of the other processors by an ethernet local area network. This system provides both Primary Rate (23B+D) and Basic Rate (2B+D) interfaces to the subscribers.

23 Claims, 1 Drawing Sheet

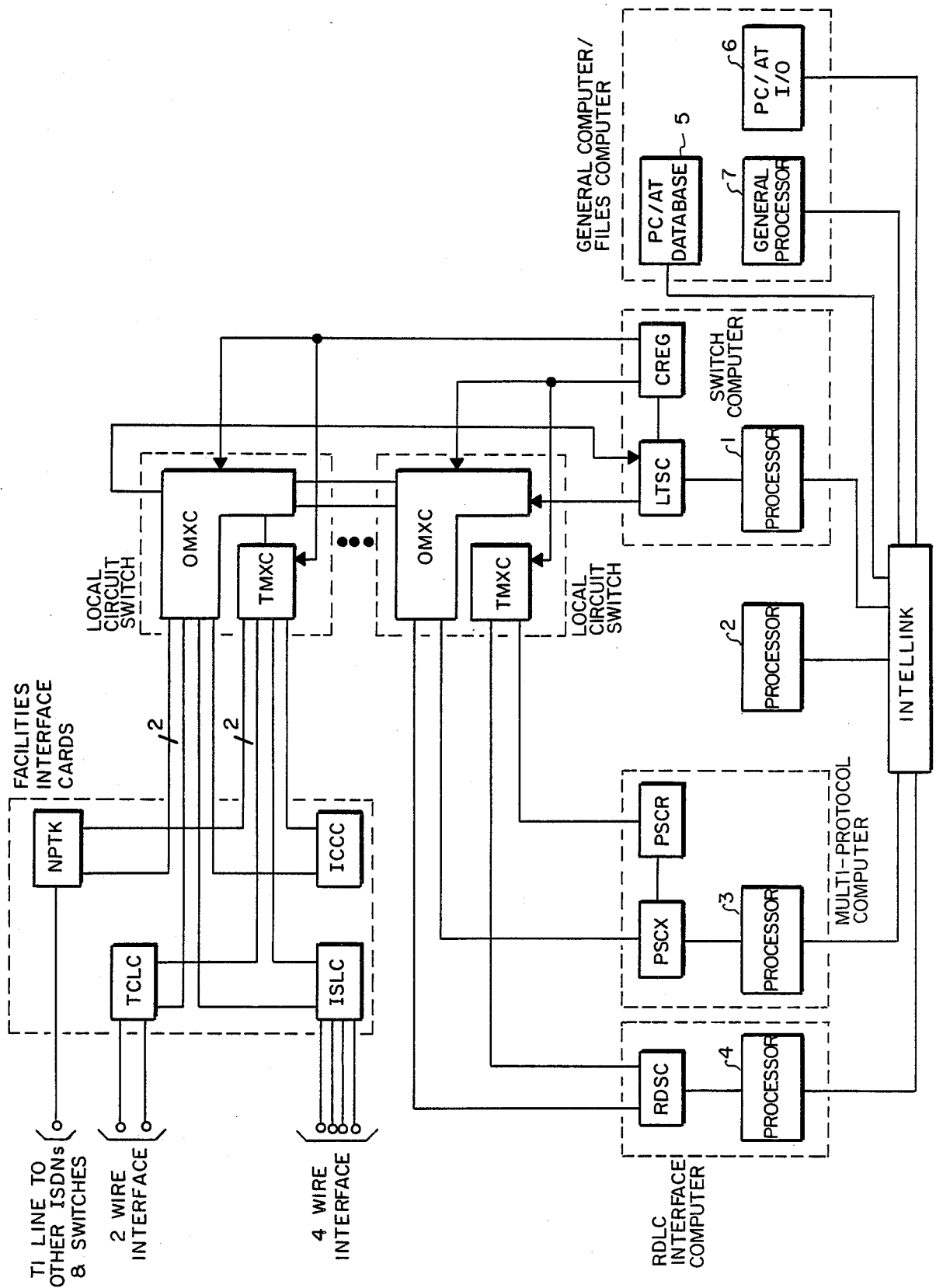

INTEGRATED SERVICES DIGITAL NETWORK MODULE

CROSS REFERENCE TO RELATED APPLICATIONS

The present Application is related to copending U.S. patent application Ser. Nos. 044,858, now abandoned; 044,616; and 044,617 now patented as U.S. Pat. No. 4,797,654, each being assigned to the same assignee as the present invention.

BACKGROUND OF THE INVENTION

The present invention pertains to telecommunication systems and more particularly to an integrated services digital network for providing both circuit and packet switching capabilities and providing for an evolution of wideband services.

In modern telecommunications, both telephone voice data and high speed digital data may be transmitted from one subscriber through a switching system to another subscriber. Typically separate systems have been established to transmit the telephone voice data the high speed digital data.

In the past, the voice data systems were generally analog in nature. The high speed digital systems, as their name implies, employ digital technology. Connecting subscribers to two different systems, one to provide voice data switching and one to provide high speed data switching, is inefficient. One subscriber who desired to hold both telephonic communications and high speed data communications would require connection to both switching systems. This requires a connection from the subscriber's physical location to each of the physical locations of the switching systems.

Accordingly, it is an object of the present invention to provide an efficient integrated services digital network arrangement for high speed data and voice communications via a common system.

SUMMARY OF THE INVENTION

An Integrated Services Digital Network (ISDN) module includes a time switching network. Subscribers are connected to the time switching network via a number of facility interface units. These facility interface units provide for two wire subscriber connection, four wire subscriber connection, T1 line connection and three port conferencing arrangements.

Originating and terminating multiplexers connect the facility interface units to the time switching network. A multi-protocol computer system provides protocol interfaces for HDLC channels. A remote data link computer system provides interface to central office switching systems from the ISDN module.

A general purpose computer and file computer are also included. These computers provide for storage of database and operating programs for each of the other computer driven systems. In addition, the general computer provides for administrative and maintenance functions for the system. The files computer also provides a man/machine interface.

The computers of the general computer and file computer system, switching network, multi-protocol computer system and remote data link system are each interconnected with another general computer via an INTELLINK ethernet local area network LAN.

BRIEF DESCRIPTION OF THE DRAWINGS

The FIGURE is a block diagram embodying the principles of operation of the present invention.

DESCRIPTION OF THE PREFERRED EMBODIMENT

The FIGURE is a block diagram of an Integrated Services Digital Network (ISDN) module according to the present invention. The International Telegraph and Telephone Consultative Committee (CCITT), study group XVIII defines integrated services digital network as: "A network evolved from the telephony integrated digital network that provides end to end digital connectivity to a wide variety of services, to which users have access by a limited set of standard multipurpose user network interfaces."

The present ISDN system provides both Basic and Primary Rate user interfaces. A Primary Rate interface interconnects various digital central office switches using T1 and DS1 signaling facilities. Basic Rate interfaces are provided at "U" and "S" network reference points.

A "U" reference point is a network connection which is assigned to a transmission line. A "U" reference point permits new transmission technology employing different transmission standards among exchange carriers. An "S" reference point corresponds to an interface between a user and various network functions.

The NPTK of the FIGURE is the North American Primary Trunk. The NPTK is one of the facility interface cards which interfaces the system's users to the ISDN system. The NPTK provides Primary Rate interface of 23B+D channels. 23B+D refers to 23 B channels and one D channel. A B channel is a 64KBPS channel used to carry a variety of digital information streams. Typical B channel uses include the following: digital speech at 64KBPS; user data at bit rates adapted to 64KBPS; and low bit rate voice.

A D channel is a 16KBPS channel used to carry digital information streams using frame oriented link access procedures. Typical D channel uses include the following: signaling control for one or more B channels; package generated by data applications; and package generated by telemetry applications.

The NPTK interfaces a single T1 digital span operating at 1.544 megabits per second to the Local Circuit Switch (LCS). This interface takes place in either a clear channel mode with extended framing or in a zero suppression mode with D4 framing. The clear channel signaling mode provides for interconnection between ISDN modules. The D4 framing mode allows the ISDN module to be connected to a GTD-5 EAX or other comparable central office switch.

Four leads connect each NPTK to the Local Circuit Switch. These connections include two data leads, one for transmission of data from the LCS to the NPTK and the other for the transmission of data from the NPTK to the LCS, a clock signal of frequency 12.352 megahertz and an ESP signal (Extended System Framing Pulse) which occurs every 125 microseconds. The frequency of the serial data of the data leads connecting the NPTK to the LCS is the same for data transmission in either direction. This data is transmitted via a serial bit stream at a frequency of 3.088 megahertz. Each frame in the bit stream consists of 32 12-bit words for a total of 386 bits. Each grouping of 12 bits is called a channel.

The next facility interface card to b considered is the ISDN Conference Circuit Card (ICCC). The ICCC provides three party digital conference calling capability to the ISDN subscribers. This card handles up to a maximum of eight simultaneous three party conference calls. The ICCC utilizes 24 of the 32 available time slots data bus in each direction.

The next facilities interface card to be considered is the ISDN "S" Interface Line Card (ISLC). This card provides an "S" interface between a subscriber and the local circuit switch. This "S" type interface is a four wire interface with limited range.

The ISLC provides 2B+D interface to the ISDN module. That is, it provides two 64KBPS B channels and one 16KBPS D channel. The B channels may be used for general transmission of information while the D channel may be used for packet signaling or data transfer.

The last type of facilities interface card of the ISDN system module is the TCM line card (TCLC). The TCLC provides a "U" interface reference point for subscriber access to the ISDN module. The TCLC is a two wire full duplex interface between the subscriber and the ISDN module with a bit rate of 144KBPS.

The nomenclature of the TCM line card refers to a time compression multiplexing line card. This is a type of burst mode data transmission. The TCLC facility interface transmits and receives voice, data or signaling information between the subscriber and the ISDN network. The voice, data or signaling information is transmitted in the 2B+D Basic Rate. The B channel is a 64KBPS voice or data channel and a D channel is a 16KBPS signaling channel.

Next, we turn to the Local Circuit Switch (LCS). The LCS connects lines, trunks and service circuits to the ISDN network. The network is fully duplex (two copies). Each copy operates with the other copy in a loosely coupled nonmatching manner. One copy is active and the other copy is a "hot" or "ready" standby. The "hot" standby may become active at any time.

Each copy of the circuit switched network consists of a variable number of Local Circuit Switches (LCSs). The same number of LCSs will be equipped in each duplicated cop of the circuit switch network. There may be up to 16 duplicated copies of the LCS in an ISDN system module.

Each LCS comprises an Originating Multiplexer Card (OMXC) and a Terminating Multiplexer Card (TMXC). The ISDN module may include up to 16 Local Circuit Switches. Each of the facilities interface cards is connected to the OMXC and to the TMXC.

The OMXC converts serial information data streams from up to 24 facility interface cards into two parallel buses, each of which is organized as 772 ninety-six KPBS time slots. The OMXC provides access to the ISDN system network via 1,544 time slots. Each bus consists of 32 channels of 96 KBPS bandwidth, an unused 8 KBPS channel and an 8 KBPS maintenance channel for a total transmission rate of 3.088 MBPS.

Each local circuit switch also includes a Terminating Multiplexer Card (TMXC). The TMXC performs preliminary time switching functions of data from either of the two buses. The TMXC distributes the data to the appropriate line circuit, trunk circuit or service circuit to which it is connected. In addition, the TMXC supplies the facilities interface cards with clock and control information and contains a microcontroller which provides the HDLC interface to the Switch Computer (SC).

The Switch Computer (SC) provides for connecting any of the Originating Multiplexer Cards to any of the Terminating Multiplexer Cards, thereby providing full connectivity between each of the line circuits, trunk circuits and service circuits of the ISDN system. The Switch Computer includes a Local Time Switch and Control unit (LTSC) which is connected as part of a ring configuration to each of the OMXCs equipped in the system. An ISDN clock regeneration card (CREG) is connected to the LTSC and each of the OMXCs equipped in the system. The CREG provides a 24 megahertz signal to each of the OMXCs and the LTSC to perform the appropriate time switching. The switch computer also includes a processor 1 which connects the LTSC to an INTELLINK. The INTELLINK is a ethernet LAN. The processor 1 may be implemented with an Intel 186/51 processor card.

The CREG card synchronizes the ISDN system to a host switching system by phase locking to an incoming 1.544 megahertz derived clock signal from the North American Primary Trunk Card (NPTK). The CREG is connected to the LTSC and to each OMXC and to each TMXC. The phase locking is provided by a voltage controlled crystal oscillator with a center frequency of 49.408 megahertz, loop filter and clock division circuits. The CREG generates three output signals: a 24.704 megahertz master synchronization clock signal, a 8 kilohertz system framing pulse signal and a 333.33 hertz burst synchronization clock signal.

The LTSC performs time switching of parallel time slots on the two buses which connect it to the LCSs.

The general computer 2 is also connected to the INTELLINK ethernet LAN. The general computer 2 may be implemented with an Intel 186/51 processor card.

Next, the multi-protocol computer (MPC) is shown. The MPC is a centralized subsystem for the reception and transmission of multiple HDLC channels.

The MPC includes three functional blocks. The first block is a processor 3 which may comprise an Intel 186/51 processor card. This processor 3 is connected to the INTELLINK ethernet LAN. The MPC also includes a protocol service circuit transmit (PSCX) and a protocol service circuit receive (PSCR). The PSCX and PSCR are state machines providing memory for the storage of HDLC data, physical termination of the channels together with link layer functions.

The PSCR receives the HDLC data of the frames and assembles this data into bytes which its stores into the PSCR memory. When a frame is complete the state machine informs the processor, so that subsequent switching may occur. The PSCX similarly operates to transmit data from its memory in the HDLC protocol. The PSCX and PSCR are connected to one another. The PSCR is connected to a TMXC of a certain Local Circuit Switch. The PSCX is connected to the OMXC of that same local circuit switch.

The RDLC interface computer (RDIC) is a GTD-5 EAX compatible data protocol processor, which emulates a multiplexer unit commonly connected to the GTD-5 EAX. The RDIC may be modified to interface to other central office switching systems. The RDIC includes the RDLC Service Circuit (RDSC) and a processor 4 which connects the RDSC to the INTELLINK ethernet LAN. The RDSC is connected to the OMXC and the TMXC of a particular Local Circuit Switch. The RDSC implements a proprietary protocol between the GTD-5 EAX and the ISDN system. The RDSC performs the first two layers of the link protocol while the processor performs the layer three functions of this protocol.

The physical link between the ISDN system and the GTD-5 EAX is a T1 carrier terminating at the NPTK facility interface card. The data link information is switched to the RDIC via the circuit switch network. The NPTK transmits to an OMXC, through the LTSC to the TMXC connected to the RDSC. The RDSC transmits to the OMXC to which it is connected, through the LTSC to the TMXC to which the NPTK is connected.

Processor 2 may be implemented with an Intel 186/51 processor card. Processor 2 is a call processing controller. Processor 2 provides for control of the call processing function of the ISDN module in conjunction with the Switch Computer's processor 1. Processor 2 also interfaces between the Switch Computer's processor 1 and the multi-protocol processor 3. However, processor 2 does not directly control any ISDN module hardware.

The last subsystem of the ISDN module consists of the General Computer/Files Computer complex (GC/FC). The GC/FC includes three computers. The first files computer is a Files Computer (FC) 5 which contains copies of all database used by the other processors of the ISDN system. This computer 5 is the database computer. It may be implemented with an IBM PC/AT.

The General Computer 7 is a file server in a Local Area Network configuration with processors 1 through 6. General Computer 7 may be implemented with an Intel RMX computer. General Computer 7 is responsible for downloading all operating programs to each of the other processors when the ISDN module is initialized or when it is expanded.

In addition, another IBM PC/AT, the I/O computer 6 provides a man/machine interface to the ISDN module for performing maintenance and administrative activities.

Although the preferred embodiment of the invention has been illustrated, and that form described in detail, it will be readily apparent to those skilled in the art that various modifications may be made therein without departing from the spirit of the invention or form the scope of appended claims.

What is claimed is:

1. An Integrated Services Digital Network module for digitally connecting a plurality of voice subscribers and a plurality of data subscribers to other public switching system subscribers, said Integrated Services Digital Network module comprising:
    digital switching means for connecting originating ones of said pluralities of said voice and data subscribers in a time division multiplexing mode to terminating ones of said pluralities of said voice and data subscribers;
    means for connecting said plurality of voice subscribers, said plurality of data subscribers and said other public switching system subscribers to said digital switching means for transmitting PCM voice samples and clear channel data between said pluralities of subscribers;
    said digital switching means including time switching means for transferring said PCM voice samples and clear channel data between said pluralities of subscribers;
    first processor means connected to said time switching means and operating to control said transfer of said PCM voice samples and clear channel data;
    second processor means for storing and transmitting operating programs and database to said first processor;
    local area network means connected to said first and to said second processor, and local area network means arranged to transfer said operating programs and database from said second processor to said first processor; and
    said means for connecting including interface means connected to said other public switching system subscribers via, other switching systems and via other integrated service digital network modules, and to said digital switching means, said interface means providing for primary rate interface of 23B+D channels between said other switching systems and said Integrated Services Digital Network modules.

2. An Integrated Services Digital Network module as claimed in claim 1, wherein said means for connecting further includes T1 line means connected between said interface means and said Integrated Services Digital Network modules and said other public switching systems.

3. An Integrated Services Digital Network module for digitally connecting a plurality of voice subscribers and a plurality of data subscribers to other public switching system subscribers, said Integrated Services Digital Network module comprising:
    digital switching means for connecting originating ones of said pluralities of said voice and data subscribers in a time division multiplexing mode to terminating ones of said pluralities of said voice and data subscribers;
    means for connecting said plurality of voice subscribers, said plurality of data subscribers and said other public switching system subscribers to said digital switching means for transmitting PCM voice samples and clear channel data between said pluralities of subscribers;
    said digital switching means including time switching means for transferring said PCM voice samples and clear channel data between said pluralities of subscribers;
    first processor means connected to said time switching means and operating to control said transfer of said PCM voice samples and clear channel data;
    second processor means for storing and transmitting operating programs and database to said first processor;
    local area network means connected to said first and to said second processors, said local area network means arranged to transfer said operating programs and database from said second processor to said first processor; and
    said means for connecting including interface means connected between said digital switching means and said pluralities of voice and data subscribers, said interface means providing basic rate interface of 2B+D channels between said plurality of voice and data subscribers and said Integrated Services Digital Network module.

4. An Integrated Services Digital Network module and claimed in claim 3, wherein said means for connecting further includes a four wire connection between said voice and data subscribers and said interface means.

5. An Integrated Services Digital Network module as claimed in claim 3, wherein said means for connecting further includes a two wire connection between said voice and data subscribers and said interface means.

6. An Integrated Services Digital Network module for digitally connecting a plurality of voice subscribers and a plurality of data subscribers to other public switching system subscribers, said Integrated Services Digital Network module comprising:

digital switching means for connecting originating ones of said pluralities of voice and data subscribers in a time division multiplexing mode to terminating ones of said pluralities of said voice and data subscribers;

means for connecting said plurality of voice subscribers, said plurality of data subscribers and said other public switching system subscribers to said digital switching means for transmitting PCM voice samples and clear channel data between said pluralities of subscribers;

said digital switching means including time switching means for transferring said PCM voice samples and clear channel data between said pluralities of subscribers;

first processor means connected to said time switching means and operating to control said transfer of said PCM voice samples and clear channel data;

second processor means for storing and transmitting operating programs and database to said first processor;

local area network means connected to said first and to said second processors, said local area network means arranged to transfer said operating programs and database from said second processor to said first processor; and said means for connecting including interface means connecting between said subscribers and said digital switching means, said interface means providing for up to eight simultaneous three-port conference calls.

7. An Integrated Services Digital Network module for digitally connecting a plurality of voice subscribers and a plurality of data subscribers to other public switching system subscribers, said Integrated Services Digital Network module comprising:

digital switching means for connecting originating ones of said pluralities of said voice and data subscribers in a time division multiplexing mode to terminating ones of said pluralities of said voice and data subscribers;

means for connecting said plurality of voice subscribers, said plurality of data subscribers and said other public switching system subscribers to said digital switching means for transmitting PCM voice samples and clear channel data between said pluralities of subscribers;

originating multiplexing means;

terminating multiplexing means; and said digital switching means including time switching means for transferring said PCM voice samples and clear channel data in incoming time slots to PCM voice samples and clear channel data in outgoing time slots, said time switching means connected to said originating and terminating multiplexing means;

first processor means connected to said time switching means and operating to control said time switching of said PCM voice samples and clear channel data from incoming to outgoing time slots;

second processor means for storing and transmitting operating programs and database to said first processor;

local area network means connected to said first and to said second processors, said local area network means arranged to transfer said operating programs and database from said second processor to said first processor.

8. An Integrated Services Digital Network module as claimed in claim 7, wherein there is further included clock regeneration means connected to said time switching means and to said originating and terminating multiplexing means, said clock regeneration means arranged to detect the frequency of said PCM voice samples and clear channel data transmitted to the digital switching means, providing therefrom a corresponding clock signal.

9. An Integrated Services Digital Network module for digitally connecting a plurality of voice subscribers and a plurality of data subscribers to other public switching system subscribers, said Integrated Services Digital Network module comprising:

digital switching means for connecting originating ones of said pluralities of said voice and data subscribers in a time division multiplexing mode to terminating ones of said pluralities of said voice and data subscribers;

means for connecting said plurality of voice subscribers, said plurality of data subscribers and said other public switching system subscribers to said digital switching means for transmitting PCM voice samples and clear channel data between said pluralities of subscribers;

protocol means connected to said digital switching means, said protocol means operating to receive HDLC formatted data from said digital switching means and to transmit HDLC formatted data to said digital switching means;

first processor means connected to said protocol means, said processor means controlling the conversion of PCM voice samples and clear channel data to HDLC format, and alternatively said processor means controlling the conversion from said HDLC format to PCM voice samples and clear channel data;

second processor means for storing and transmitting operating programs and database to said first processor; and local area network means connected to said first and to said second processors, said local area network means arranged to transfer said operating programs and database from said second processor to said first processors.

10. An Integrated Services Digital Network module for digitally connected a plurality of voice subscribers and a plurality of data subscribers to other public switching system subscribers, said Integrated Services Digital Network module comprising:

digital switching means for connecting originating ones of said pluralities of said voice and data subscribers in a time division multiplexing mode to terminating ones of said pluralities of said voice and data subscribers;

means for connecting said plurality of voice subscribers, said plurality of data subscribers and said other public switching system subscribers to said digital switching means for transmitting PCM voice samples and clear channel data between said pluralities of subscribers;

remote data link means connected to said digital switching means, said remote data link means transmitting and receiving data through said digital switching means to and from other public switching systems first processor means connected to said remote data link means for controlling said transmission and reception of PCM voice and clear channel data to and from other public switching systems;

second processor means for storing and transmitting operating programs and database to said first processor; and local area network means connected to said first and to said second processors, said local area network means arranged to transfer said operating programs and database from said second processor to said first processor.

11. An Integrated Services Digital Network module for digitally connecting a plurality of voice subscribers and a plurality of data subscribers to other public switching system subscribers, said Integrated Services Digital Network module comprising:

digital switching means for connecting originating ones of said pluralities of said voice and data subscribers in a time division multiplexing mode to terminating ones of said pluralities of said voice and data subscribers;

means for connecting said plurality of voice subscribers, said plurality of data subscribers and said other public switching system subscribers to said digital switching means for transmitting PCM voice samples and clear channel data between said pluralities of subscribers;

originating multiplexing means;

terminating multiplexing means;

said digital switching means including time switching means for transferring said PCM voice samples and clear channel data in incoming time slots to PCM voice samples and clear channel data in outgoing time slots, said time switching means connected to said originating and terminating multiplexing means;

first processor means connected to said time switching means and operating to control said time switching of said voice samples and data from incoming to outgoing time slots;

second processor means, and a plurality of associated processors, said second processor means storing and transmitting operating programs and database to said associated processors;

local area network means for transferring data between said associated processors, said local area network means connected to said first processor means and to said second processor means, for transmitting said operating programs and said database to said first processor means.

12. An Integrated Services Digital Network module as claimed in claim 11, wherein there is further included:

third processor means connected to said local area network means and operating to assist said first processor means to control said time switching of said voice samples and said data from said incoming to said outgoing time slots; and said third processor means being connected to said second processor means via said local area network means to receive said transmitted operating programs and database.

13. An Integrated Services Digital Network module as claimed in claim 12, said second processor means including fourth processor means connected to said local area network means, said fourth processor means transmitting said database to said third processor means.

14. An Integrated Services Digital Network module as claimed in claim 13, said second processor means including fifth processor means connected to said local area network means said fifth processor means transmitting said operating programs to said third processor means.

15. An Integrated Services Digital Network module as claimed in claim 11, wherein there is further included:

protocol means connected to said digital switching means, said protocol means operating to receive HDLC formatted data from said digital switching means and to transmit HDLC formatted data to said digital switching means;

third processor means connected to said protocol means, said processor means controlling said conversion of PCM voice samples and clear channel data to HDLC formatted data, and alternatively said processor means controlling said conversion from said HDLC formatted data to PCM voice samples and clear channel data; and said third processor means connected to said second processor means via said local area network means to receive said transmitted operating programs and database.

16. An Integrated Services Digital network module as claimed in claim 15, said second processor means including fourth processor means connected to said local area network means, said fourth processor means transmitting said database to said third processor means.

17. An Integrated Services Digital Network module as claimed in claim 16, said second processor means including fifth processor means connected to said local area network means and fifth processor means transmitting said operating programs to said third processor means.

18. An Integrated Services Digital Network module as claimed in claim 11, wherein there is further included:

remote data link means connected to said digital switching means, said remote data link means transmitting and receiving data through said digital switching means to and from other public switching systems;

third processor means connected to said remote data link means for controlling said transmission and reception of data to and from other public switching systems; and said third processor means connected to said second processor means via said local area network means to receive said transmitted operating programs and database.

19. An Integrated Services Digital network module as claimed in claim 18, said second processor means including fourth processor means connected to said local area network means, said fourth processor means transmitting said database to said third processor means.

20. An Integrated Services Digital Network module as claimed in claim 19, said second processor means including fifth processor means connected to said local area network means said fifth processor means transmitting said operating programs to said third processor means.

21. An Integrated Services Digital Network module as claimed in claim 11, said local area network means including ethernet local area network means.

22. An Integrated Services Digital Network module as claimed in claim 21, said ethernet local area network means including an INTELLINK local area network.

23. An Integrated Services Digital Network module as claimed in claim 11, said second processor means including third processor means connected to said local area network means, said third processor means providing Input/Output to an attendant.

* * * * *